United States Patent
Bratton et al.

(10) Patent No.: US 6,904,365 B2
(45) Date of Patent: Jun. 7, 2005

(54) METHODS AND SYSTEMS FOR DETERMINING FORMATION PROPERTIES AND IN-SITU STRESSES

(75) Inventors: Tom R. Bratton, Kingwood, TX (US); Bikash Kumar Sinha, West Redding, CT (US); Thomas J. Plona, New Milford, CT (US); Benjamin P. Jeffryes, Cambridgeshire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 56 days.

(21) Appl. No.: 10/605,526

(22) Filed: Oct. 6, 2003

(65) Prior Publication Data

US 2004/0176911 A1 Sep. 9, 2004

Related U.S. Application Data

(60) Provisional application No. 60/452,456, filed on Mar. 6, 2003.

(51) Int. Cl.[7] .................................................. G01V 1/40
(52) U.S. Cl. ............................................. 702/9; 702/11
(58) Field of Search ........................... 702/6, 9, 11, 12, 702/13; 367/73; 703/10

(56) References Cited

U.S. PATENT DOCUMENTS

| | | |
|---|---|---|
| 3,896,668 A | 7/1975 | Anderson et al. |
| 5,025,669 A | 6/1991 | Sarda et al. |
| 5,142,471 A | 8/1992 | Desbrandes |
| H1156 H | 3/1993 | Siegfried, II |
| 5,236,040 A | 8/1993 | Venditto et al. |
| 5,398,215 A * | 3/1995 | Sinha et al. .................. 367/31 |
| 5,475,650 A | 12/1995 | Sinha et al. |
| 5,838,633 A | 11/1998 | Sinha |
| 6,098,021 A | 8/2000 | Tang et al. |
| 6,188,961 B1 | 2/2001 | Mandal |
| 6,351,991 B1 | 3/2002 | Sinha |
| 6,609,067 B2 * | 8/2003 | Tare et al. ...................... 702/9 |
| 6,611,761 B2 * | 8/2003 | Sinha et al. .................... 702/6 |
| 6,614,716 B2 | 9/2003 | Plona et al. |
| 2002/0116128 A1 * | 8/2002 | Sinha et al. .................... 702/6 |
| 2002/0183930 A1 | 12/2002 | Plona et al. |
| 2004/0176911 A1 * | 9/2004 | Bratton et al. ................. 702/6 |

FOREIGN PATENT DOCUMENTS

GB 2292799 3/1996

OTHER PUBLICATIONS

Bratton, T.R. et al., How to Diagnose Drilling Induced Fractures in Wells Drilled with Oil–Based Muds with Real–Time Resistivity and Pressure Measurements, SPE/IADC 67742, Feb. 27–Mar. 1, 2001, pp. 1–10.

Bratton, Tom et al., Logging–While Drilling Images for Geomechanical, Geological and Petrophysical Interpretations, pp. 1–14, no date.

Sayers, Colin M. et al., Pore Pressure Prediction for the Cocuite Field, Veracruz Basin, SPE 77360, Sep. 29–Oct. 2, 2002, pp. 1–5.

* cited by examiner

Primary Examiner—Donald McElheny, Jr.
(74) Attorney, Agent, or Firm—Victor H. Segura; Brigitte L. Echols (57) ABSTRACT

Systems and methods for determining a formation property related to formation strength and stresses are disclosed. A method for determining a formation strength includes obtaining radial formation property measurements at different wellbore pressures; generating a radial stress profile based on a formation model; generating a radial stress function from the radial stress profile; and comparing the radial formation property measurements with the radial stress function to determine the formation strength. A method for determining a formation stress profile includes deriving formation parameters from a formation radial profiling; obtaining formation log data that comprise formation density data; estimating formation stresses from the formation log data; and deriving a radial stress profile based on a formation model, the derived formation parameters, and the estimated formation stresses.

39 Claims, 8 Drawing Sheets

METHODS AND SYSTEMS FOR DETERMINING FORMATION PROPERTIES AND IN-SITU STRESSES

CROSS REFERENCE TO RELATED APPLICATIONS

This application claims priority pursuant to 35 U.S.C. §119 of U.S. Provisional Application Ser. No. 60/452,456 filed on Mar. 6, 2003. This provisional application is hereby incorporated by reference in its entirety.

BACKGROUND OF INVENTION

1. Field of the Invention

The invention relates generally to the analysis of underground earth formations, and, more particularly, to the determination of formation strength and stress properties from subsurface measurements.

2. Background Art

Detailed knowledge of geological formation stresses is desirable in the hydrocarbon production business, because formation stresses can affect the planning of well stimulation treatments to enhance hydrocarbon recovery as well as provide predictions of sanding and wellbore stability. In addition, formation stress determinations can also prove useful in determining the long-term stability of the formation and thus the suitability of the formation as a repository for waste disposal. Accordingly, there is a growing demand in the industry for the estimations or determinations of formation stresses.

There are two types of stresses important in the analysis of wellbore rock mechanics and stability: far-field stresses and wellbore stresses. Far-field stresses exist in the formation far away from the wellbore. By definition, far-field stresses are not influenced by the wellbore. Instead, they are naturally occurring in the formation. In contrast, wellbore stresses act on the formation at the mud-formation interface. The wellbore stresses are created when the wellbore is drilled. The wellbore stresses are influenced by the far-field stresses as well as the drilling fluid "mud" density.

Principal stresses refer to a coordinate system that is aligned with the stresses such that the three stresses have components normal to the reference frame. The principal stress concept simplifies the computations and explanations of the formation stresses. A Cartesian coordinate system is typically used to describe the far-field stresses. With the Cartesian coordinate system, the far-field principal stresses can be described by a vertical stress, $\sigma_v$, and two horizontal stresses. If the magnitudes of the two horizontal stresses are different, and they usually are, they are termed the minimum, $\sigma_h$, and the maximum, $\sigma_H$, horizontal stresses. In addition to the magnitudes of these three stresses ($\sigma_v$, $\sigma_h$, $\sigma_H$), the direction of either $\sigma_h$ or $\sigma_H$ is needed in order to the completely define the far-field stresses.

In a vertical well, a cylindrical coordinate system is typically used to describe the wellbore stresses. Here, the principal stresses include a radial stress, $\sigma_r$, and two orthogonal stresses: axial, $\sigma_a$, and tangential, $\sigma_t$. The radial stress ($\sigma_r$) is directed from the center of the wellbore out into the formation. The axial stress ($\sigma_a$) is directed along the axis of the borehole. The tangential stress ($\sigma_t$) is directed around the circumference of the wellbore. The tangential stress ($\sigma_t$) is also called the hoop stress because of this geometry.

Figure 1:
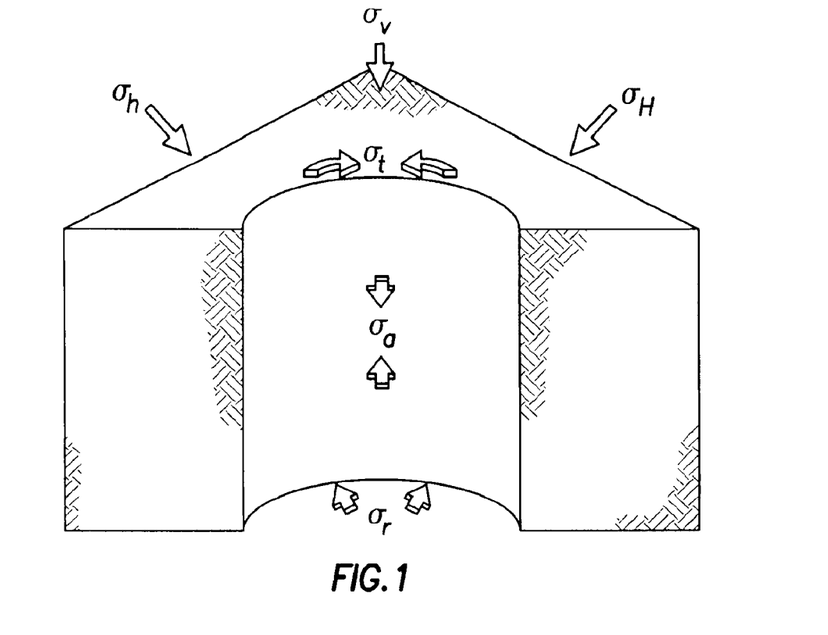
FIG. 1 illustrates the principal stresses involved in wellbore rock mechanics.

FIG. 1 illustrates the principal stresses involved in wellbore rock mechanics and stability. As shown, a Cartesian coordinate system is used for the vertical and horizontal principal far-field stresses and a cylindrical reference frame for the principal wellbore stresses. For clarity, the following description assumes a vertical wellbore unless otherwise noted. However, embodiments of the invention are generally applicable and are not limited to only vertical wellbores or any particular coordinate system. For example, one of ordinary skill in the art would appreciate that embodiments of the invention may also use techniques known in the art to handle non-vertical far-field stresses and deviated wellbores.

Figure 2:
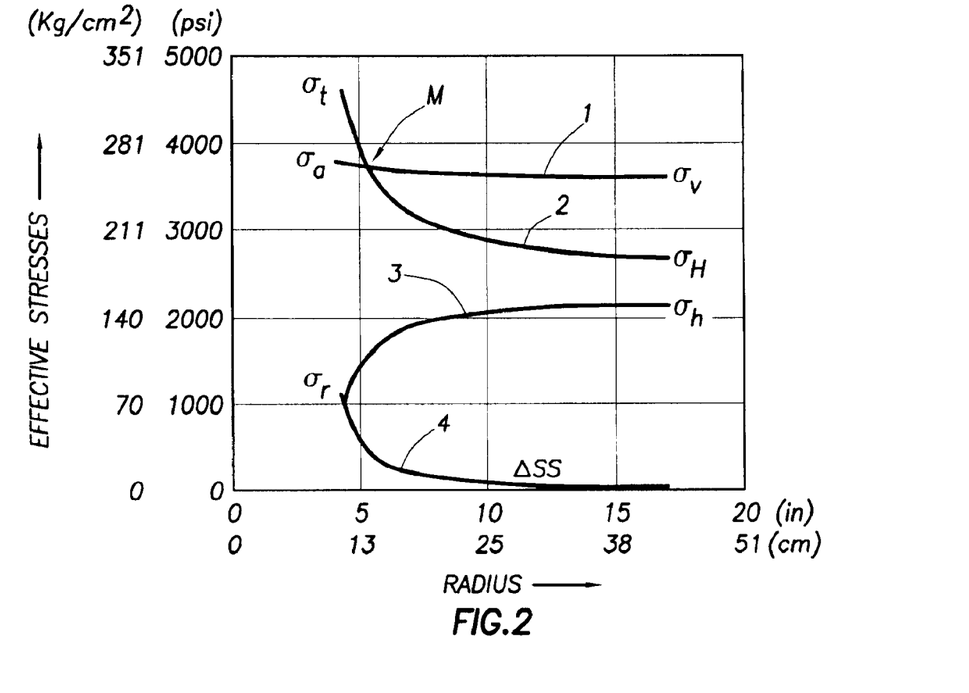
FIG. 2 illustrates a formation stress profile in accordance with one embodiment of the invention.

FIG. 2 illustrates a formation stress profile. The formation stress profile depicts the variation in magnitudes of the principal stresses (i.e., far-field and wellbore stresses) as a function of the distance away from the center of a wellbore. Note that both the magnitudes and directions of the principal stresses change with the distance. Thus, the far-field vertical stress ($\sigma_v$) is related to the axial stress ($\sigma_a$) at the wellbore. This relationship is illustrated by curve 1. The far-field maximum horizontal stress ($\sigma_H$) is related to the tangential stress ($\sigma_t$) at the wellbore. This relationship is illustrated by curve 2. Similarly, the far-field minimum stress ($\sigma_h$) is related to the radial stress ($\sigma_r$) at the wellbore. This relationship is illustrated by curve 3.

Of these six stresses shown in FIG. 2, the radial stress ($\sigma_r$) is the only stress that can be directly controlled by the driller. The remaining stresses are either naturally occurring (i.e., the far-field stresses) or are influenced by the far-field stresses, the engineer's choice of the radial stress ($\sigma_r$) (i.e., the choice of mud weights), and the physics of rock deformation (i.e., the axial stress ($\sigma_a$) and the tangential stress ($\sigma_t$)). The engineer controls the radial stress ($\sigma_r$) by choosing a mud density, or an equivalent circulating density (ECD). The ECD is a measure of downhole pressure converted to an equivalent mud density for the driller. ECD accounts for not only the static mud density, but also additional pressures arising from mud pump or drill string motions. In defining a radial stress profile, a formation model (rock deformation model) based on the linear elastic theory is typically used to illustrate the stress behavior. However, more complex formation models may also be used, such as non-linear elastic model, elastoplastic model, plastic model, and an explicit constitutive model.

Stresses in the earth are generally compressive and in this description, reckoned positive. The grains of the formation are forced together by compressive stresses. For example, the far-field vertical stress is caused by the weight of the overburden. Tensile stresses act in opposite directions pulling the grains apart. Different stress regimes can cause different mechanisms of yield and failure. Shear yielding, that eventually leads to shear failure, is initiated by two orthogonal stresses with sufficiently different magnitudes. Tensile yielding and failure is initiated by a single tensile stress. These two mechanisms are commonly observed in wellbore images.

When a formation is exposed to sufficiently different orthogonal stresses, the grains will be sheared apart. The shear stress, which causes shear yielding and failure, is proportional to the difference between the maximum and minimum principal stress. Conventionally, shear stress= ½(maximum stress-minimum stress). As shown in FIG. 2, at about 6 or more inches away from the borehole, the maximum principal stress is slightly greater than the far-field vertical stress ($\sigma_v$) (e.g., curve 1) and the minimum principal stress magnitude is between the wellbore radial stress ($\sigma_r$) and the far-field minimum horizontal stress ($\sigma_h$) (e.g., curve 3). Note that the changes in the shear stress (or delta shear stress, $\Delta$ss, to be explained later) (shown as curve 4) are small in regions far away from the wellbore. However, at a radial distance of about 6 inches or less, the increase in the shear stress accelerates (see curve 4). In the near wellbore region, the maximum principal stress is no longer similar in magnitude to the far-field vertical stress ($\sigma_v$). Instead, the tangential stress ($\sigma_t$) becomes the maximum principal stress. Note that as this transition occurs, the direction of the maximum stress rotates by 90 degrees, i.e., from vertical to tangential (horizontal).

Therefore, the shear stress in the region between 6 and 20 inches are proportional to ½(curve1−curve3), while the shear stress in the region from the wellbore to about 6 inches is determined by ½(curve2−curve3). The near wellbore shear stress, ½($\sigma_{t-\sigma_r}$), is often larger than that in the far field, ½($\sigma_v-\sigma_h$). This is due to the change in loading caused by the creation of the wellbore when the formation is replaced with drilling mud. The "additional loading" induced by the wellbore may be more conveniently represented by a delta shear stress ($\Delta$ss) function defined as $\Delta\text{ss}=\frac{1}{2}(\sigma_1-\sigma_3)-\frac{1}{2}(\sigma_v-\sigma_h)$, where $\sigma_v$ and $\sigma$correspond to the vertical and minimum horizontal far-field stresses, respectively, and $\sigma_1$ and $\sigma_3$ correspond to the maximum and minimum stresses, respectively, at a given distance into the formation. Those skilled in the art will appreciate that the vertical stress ($\sigma_v$) and the minimum horizontal stress ($\sigma_h$) in the above equation may need to be replaced with the appropriate minimum and maximum far-field stress, respectively, for the formation being analyzed. For example, in a formation having $\sigma_H>\sigma_v>\sigma_h$, the maximum and minimum stresses are $\sigma_H$ and $\sigma_h$, respectively. The delta shear stress function ($\Delta$ss) thus defined is a more sensitive indicator of near wellbore shear stress. The shear stress or the delta shear stress ($\Delta$ss) as a function of radial distance from the wellbore is referred to as a "radial stress function" in this description.

The magnitudes of delta shear stress ($\Delta$ss) as a function of distance away from the borehole is illustrated as curve 4 in FIG. 2. When the drilling engineer chooses a low wellbore pressure (i.e., low ECD), the shear stress (curve 4) increases significantly near the wellbore. In the example shown, the radial stress, $\sigma_r$, is about one-half of the minimum far-field stress, $\sigma_h$. The large shear stress near wellbore may yield the formation and lead to breakouts.

As noted above, curves 1 and 2 cross over at about 6 inches from the wellbore. The cross over (mode transition) occurs at point M, where the magnitudes of the far-field vertical stress ($\sigma_v$) and the tangential stress ($\sigma_t$) are equal. This cross over point M marks an important stress mode transition because the formation behavior changes significantly at this point as a result of the 90-degree change in the direction of the maximum stress. If a logging measurement can infer a change in behavior related to this substantial increase in stress and measure the wellbore pressure that is associated with this change, significant information may be gained about the formation strengths as well as the stresses acting on the formation.

Figure 3A:
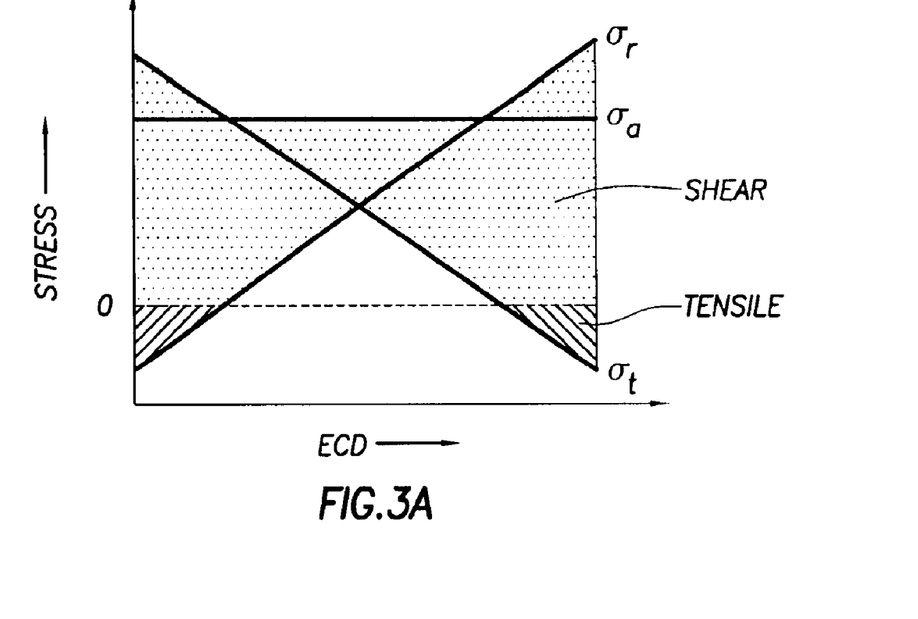
FIGS. 3A and 3B illustrate the relationship of the wellbore stresses as a function of equivalent circulating density in accordance with one embodiment of the invention.
Figure 3B:
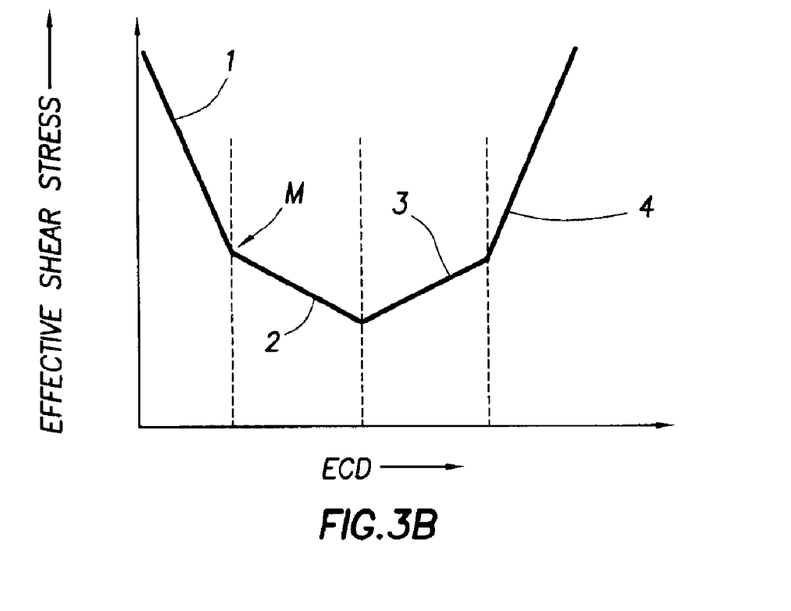

FIG. 3 illustrates the wellbore stresses as a function of the equivalent circulating density (ECD). In a vertical well, the radial stress ($\sigma_r$) increases with ECD; the tangential stress ($\sigma_t$) decreases with ECD; and the axial stress ($\sigma_a$) is independent of ECD. Yielding occurs when the wellbore stresses exceed the yield strength, and failure occurs when the wellbore stresses exceed the failure strength. As noted above, two mechanisms of yielding and failure (i.e., shear and tensile) are commonly observed. Shear failure occurs when the shear stress exceeds the shear strength. Shear stress, which is proportional to the difference between the maximum and minimum wellbore stress, occurs in regions marked with stipples in FIG. 3. Tensile failure occurs when a tensile stress is greater than the tensile strength of the formation. By convention, tensile stresses are negative, so any stress less than zero is tensile, as represented by the hashed areas in FIG. 3.

It is apparent from FIG. 3 that the geometry (orientation) of the failure may change with the radial stress ($\sigma_r$) (or ECD) because the stresses that cause the formation yielding and failure change directions. Therefore, depending on the magnitudes and orientations of the various stresses acting on a formation, several modes of formation failure are possible. For a comprehensive discussion of the various failure modes, see Tom Bratton et al., *Logging-While-Drilling Images For Geomechanical, Geological and Petrophysical Interpretations*, SPWLA paper JJJ, 1999.

The change in orientations of stresses acting on a formation is dependent on the far-field stresses. Thus, determination of far-field stresses is essential in the analysis of formation strength and stresses. The far-field vertical stress ($\sigma_v$), which depends on the overburden, can be reliably determined by integrating the formation bulk density from the surface to the depth of interest. On the other hand, the minimum ($\sigma_h$) and maximum ($\sigma_H$) horizontal stresses are conventionally derived from hydraulic fracturing tests and analyzing borehole breakouts. Specifically, observations of fracture behavior, measurements of the ECD when a vertical fracture closes, and a model of rock deformation (e.g., a linear elastic model) are typically used to invert for the minimum horizontal stress ($\sigma_h$). Similarly, observations of breakouts, measurements of the ECD that caused the failure, and a model of rock deformation (e.g., a linear elastic model) are typically used to invert for the maximum horizontal stress ($\sigma_H$). However, the accuracies of these approaches depend on the accuracies of the estimation of the formation shear strength (from formation breakouts and fractures) and the assumptions of linear elasticity.

U.S. Pat. No. 5,838,633, issued to Sinha and assigned to the present assignee, discloses methods for estimating formation in-situ stress magnitudes using a sonic borehole tool. The methods disclosed in this patent do not depend on knowledge of the formation breakouts or fractures. This patent is incorporated by reference in its entirety. The methods disclosed in this patent analyze flexural wave dispersions from dipole sources that are aligned parallel and perpendicular to the maximum far-field compressive stress direction. In addition, these methods also analyze the Stoneley wave dispersion from a monopole source. In the presence of formation and borehole stresses that are in excess of the stress levels of an isotropic reference state, the borehole flexural and Stoneley wave velocity dispersions are also functions of the formation stresses. A multi-frequency inversion of the flexural or Stoneley wave velocity dispersions over a selected frequency band may then be performed to determine the uniaxial stress magnitudes.

Similarly, U.S. Pat. No. 6,351,991 B1, issued to Sinha and assigned to the present assignee, discloses methods for determining stress parameters of formations from multi-mode velocity data, which do not depend on the formation breakouts or fractures. This patent is incorporated by reference in its entirety. The methods disclosed in this patent uses acoustic logging instruments to measure compressional velocity, fast-shear velocity, slow-shear velocity, and Stoneley velocity. Note that velocity and its inverse, the slowness, are used interchangeably in this description. These measurements together with estimates of a second set of parameters are used to derive formation in-situ stress parameters.

In addition to formation stresses, knowledge of the formation strength is also important for predicting wellbore stability and for choosing the optimal conditions to complete the wells. Formation strength is conventionally estimated from a correlation between dynamic elastic moduli or formation porosity and the unconfined compressional strength of a core sample. However, such correlation often provides rough estimates that are too inaccurate for many applications.

Improved techniques for measuring formation strength and evaluating formation stresses are desired. Further, techniques that can measure in-situ formation properties without relying on formation breakouts or fractures are needed.

SUMMARY OF INVENTION

One aspect of the invention relates to methods for determining a formation strength from formation property measurements as a function of wellbore pressures. A method for determining a formation strength in accordance with the invention includes obtaining radial formation property measurements at different wellbore pressures; generating a radial stress profile based on a formation model; generating a radial stress function from the radial stress profile; and comparing the radial formation property measurements with the radial stress function to determine the formation strength.

One aspect of the invention relates to methods for determining a radial stress profile from formation strength using formation property measurements as a function of wellbore pressures. A method for determining a radial stress profile in accordance with the invention includes deriving formation parameters from a formation radial profiling; obtaining formation log data that comprise formation density data; estimating formation stresses from the formation log data; and deriving a radial stress profile based on a formation model, the derived formation parameters, and the estimated formation stresses.

One aspect of the invention relates to methods for monitoring formation stability. A method in accordance with the invention includes obtaining formation property measurements at at least two different wellbore pressures; and deriving a rate of change of the formation property measurements as a function of wellbore pressure to monitor the formation stability.

One aspect of the invention relates to systems for determining a property of a formation. A method in accordance with embodiments of the invention includes a computer system having a memory for storing a program including instructions for: obtaining formation property measurements at different wellbore pressures; generating a radial stress profile based on a formation model; generating a radial stress function from the formation stress profile; and comparing the formation property measurements with a radial stress function to determine a formation strength.

One aspect of the invention relates to systems for determining a property of a formation. A system in accordance with the invention includes a computer system having a memory for storing a program including instructions for: obtaining formation property measurements at different wellbore pressures; generating a radial stress profile based on a formation model; generating a radial stress function from the formation stress profile; and comparing the formation property measurements with a radial stress function to determine the formation strength.

One aspect of the invention relates to systems for determining a property of a formation. A system in accordance with the invention includes a computer system having a memory for storing a program including instructions for: deriving formation parameters from a radial profile, wherein the formation parameters comprise a formation strength; obtaining formation log data that comprise formation density data; estimating formation stresses from the formation log data; and deriving a radial stress profile based on a formation model, the derived formation parameters, and the estimated formation stresses.

Other aspects and advantages of the invention will be apparent from the following description and the appended claims.

DETAILED DESCRIPTION

Embodiments of the present invention relate to techniques for measuring formation stresses, strength, etc. Geomechanical processes have enormous financial impact on most oilfield operations. However, geomechanical processes are complex and difficult to diagnose and model. The best strategy to understand geomechanical processes is to observe these processes under in-situ conditions. Embodiments of the invention use measurements of formation responses to wellbore pressure perturbations to provide important insights into the geomechanical properties of the formations.

Specifically, embodiments of the invention use pressure perturbations in a wellbore, together with other formation property measurements (e.g., acoustic measurements, resistivity measurements, etc.) that vary with the pressure perturbations, to derive formation properties (e.g., strength) or in-situ stresses. Formation stresses include shear stresses and tensile stresses, which may lead to shear failures and tensile failures. The wellbore pressure perturbations may be passively encountered in drilling operations or actively instigated by the driller, e.g., turning the pump on and off, changing the setting of a valve, allowing ingress of formation fluids, or changing the mud weights. Use of pressure measurements to probe geomechanical properties of formations are described in T. R. Bratton et al., *How to Diagnose Drilling Induced Fractures in wells Drilled with Oil-Based Muds with Real-Time resistivity and Pressure Measurements*, SPE paper 67742, 2001.

In accordance with embodiments of the invention, a series of formation property measurements as a function of different wellbore pressures may be acquired at a single depth where multiple pressure recordings and formation property measurements can be made. Alternatively, these measurements may be performed at multiple depths where the formation properties are equivalent. If the measurements are acquired at a single depth, the measurements may be conducted in a manner similar to a conventional leak-off test (LOT) i.e., a tool is stationary at a well depth and a series of pressure measurements and suitable formation property measurements (e.g., acoustic measurements) are acquired.

For example, measurements may be obtained for a predetermined period of time, starting when the pump is turned off and then recording the change in acoustic response as a function of pressure change for a predetermined period of time. In one embodiment of the invention, measurements are taken as the pumps are shutting down (stop flow) during a normal drilling connection, or, if desired, shutting the pumps down and waiting for a pre-determined time to make the measurements. Measurements are then taken for a selected period of time after the pumps are stopped (or after waiting for a predetermined period of time). The changes in pressure between pumps on and off depend on the flow rate, cuttings, mud properties, and annular size.

Some embodiments of the invention relate to methods for estimating formation strengths from dipole shear radial profiling. Concentration of stresses around the wellbore gives rise to anomalies in an induced acoustical wave field. These anomalies, which can be measured by an acoustical logging device, are governed by the strength characteristics of the formation. From the acoustic measurements, the formation stresses at the radial distance where these anomalies occur may be estimated. The formation stress estimates in turn can provide information on the strength characteristics of the formation.

Figure 4:
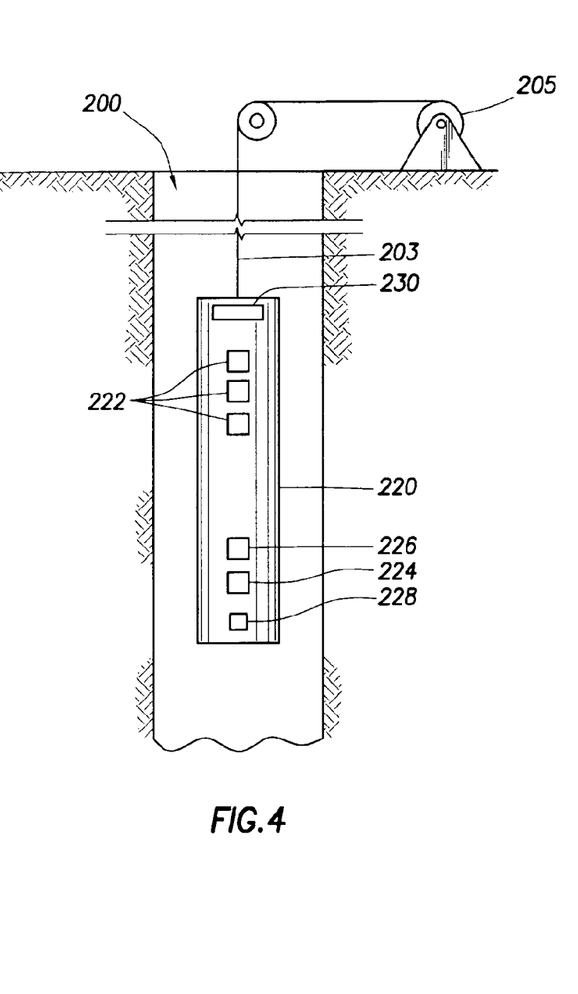
FIG. 4 illustrates an acoustic logging tool disposed in a borehole in accordance with one embodiment of the invention.

Formation property measurements that may be used with embodiments of the invention include any measurement that can respond to pressure changes in the wellbore. Examples of these measurements include acoustic measurements, resistivity measurements, and spontaneous potential measurement. Although embodiments of the invention may use any formation measurement that responds to pressure changes in the wellbore, for clarity, the following description uses acoustic measurements as an example. Acoustic (or sonic) logging, which employs sound waves to obtain information about subsurface formations, entails lowering a sonic logging instrument into a wellbore drilled through the formations. Examples of sonic logging instruments may be found in U.S. Pat. Nos. 5,838,633, 5,852,587, 5,309,404, 5,387,767, and 4,594,691. Each of these instruments typically includes an acoustic transmitter and a plurality of receivers spaced apart from the transmitter along the longitudinal axis of the instrument. In accordance with embodiments of the invention, any of the prior art acoustic logging instruments may be used with other modules having the capability to measure borehole pressures. Alternatively, an acoustic logging instrument may be modified to include a pressure sensor. An acoustic tool including a pressure sensor is illustrated in FIG. 4. This tool is similar to the dipole sonic imager service DSI™ provided by Schlumberger Technology Corporation. The acoustic tool (220) is suspended in a wellbore (200) by means of a wireline (203) and a winch (205), as is well known in the art. The acoustic tool (220) may include a plurality of acoustic detectors (receivers) (222), and one or more acoustic energy sources (transmitters), which can be a monopole source (224) or a dipole source (226). The monopole source (224) provides a Stoneley wave as well as a compressional headwave in all formations. The monopole source (224) may also provide a shear headwave in fast formations. The dipole source (226), on the other hand, provides a flexural wave. In addition, the shear wave arrival time can be found as the low frequency limit of the flexural wave dispersion arrivals. The acoustic detectors (222) typically include both monopole and dipole detectors. The acoustic tool (220) also includes a pressure sensor (228) that is used to measure the wellbore pressure. The acoustic tool (220) may further include a down-hole processing unit (230), which typically comprises a microprocessor and associated circuitry, coupled to the detectors (222). The downhole processing means (230) can determine the shear and compressional wave velocities and can process the flexural or Stoneley wave information using any processing method known in the art, such as the Prony's method. A detailed description of Prony's method is set forth in S. W. Lang et al., *Estimating Slowness Dispersion from Arrays of Sonic Waveforms*, 52 Geophysics, 530–544 (1989). Alternatively, the log data may be stored in the tool (e.g., the processing means (230)) for later processing.

In an acoustic logging operation, the monopole transmitter (224) or dipole transmitter (226) is periodically actuated to emit pulses of acoustic energy into the wellbore, which travels through drilling fluid in the wellbore and then along the wall of the wellbore. After traveling along the wellbore wall, some of the acoustic energy travels to the receivers (222), where acoustic waves are detected. Various attributes of the detected acoustic energy are dependent on the properties of the formations, such as compressional velocity and shear velocity. The formation properties that can affect acoustic energy transmission include formation strength and in-situ stresses of the formation. Therefore, acoustic measurements may be used to infer magnitudes of the in-situ stresses imposed upon subsurface formations.

The acquired acoustic measurements need to be processed to provide the desired formation properties. Processing known in the art for determining compressional and/or shear velocity includes correlation of the waveforms of the acoustic energy detected at each of the receivers. The correlation is performed using various values of slowness (the inverse of velocity) until a degree of coherence between all the waveforms is determined. A well-known method for such processing is the Prony's method noted above.

Figure 5:
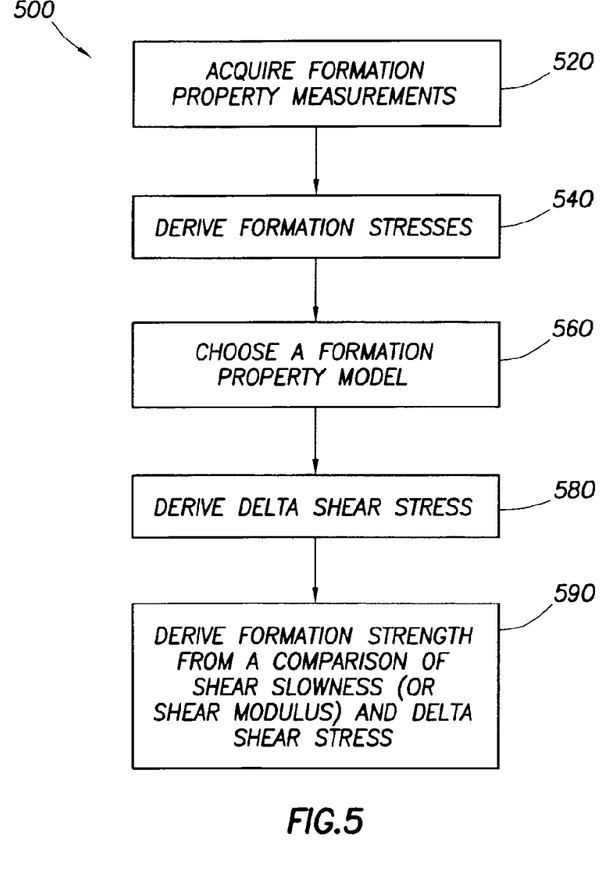
FIG. 5 illustrates a method for determining formation strength from formation stresses in accordance with one embodiment of the invention.

FIG. 5 illustrates a method 500 in accordance with one embodiment of the invention. Initially, formation property measurements are acquired (step 520). As noted above, the formation property measurements can be any measurements that respond to wellbore pressure changes. Suitable formation property measurements include acoustic measurements, resistivity measurements, etc. For clarity, the following description assumes that acoustic measurements are acquired with a sonic tool, such as tool (220) shown in FIG. 4. The formation property measurements are typically made with respect radial distance from the wellbore. Therefore, these formation property measurements may be referred to as "radial formation property measurements."

Figure 6A:
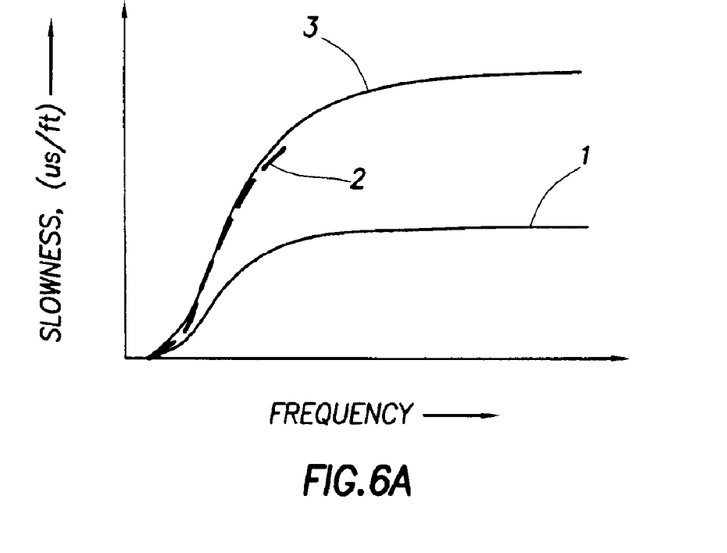
FIGS. 6A and 6B illustrate shear slowness deviations from the expected response as a result of wellbore stresses in accordance with one embodiment of the invention.

In U.S. Pat. No. 5,838,633, Sinha showed that sonic velocities in a formation exhibit frequency-dependent dispersions. FIG. 6A shows a plot of shear slowness as a function of acoustic wave frequencies. Shear slowness ($\Delta t$) is the inverse of shear velocity (i.e., 1/V). As shown, curve 1 illustrates a normal dispersion curve that would be expected in a formation under homogeneous shear stresses. However, the logging data as acquired using a sonic tool in a wellbore, shown as curve 2, exhibit substantial deviations from the normal dispersion curve 1. The deviations of the log data from the normal dispersion curve result from substantial reductions in the shear velocities. These reductions in shear velocities arise from near wellbore stresses, as evidenced by the fact that a dispersion curve, which takes into account the wellbore stresses (shown as curve 3), closely matches the experimental data (curve 2).

Figure 6B:
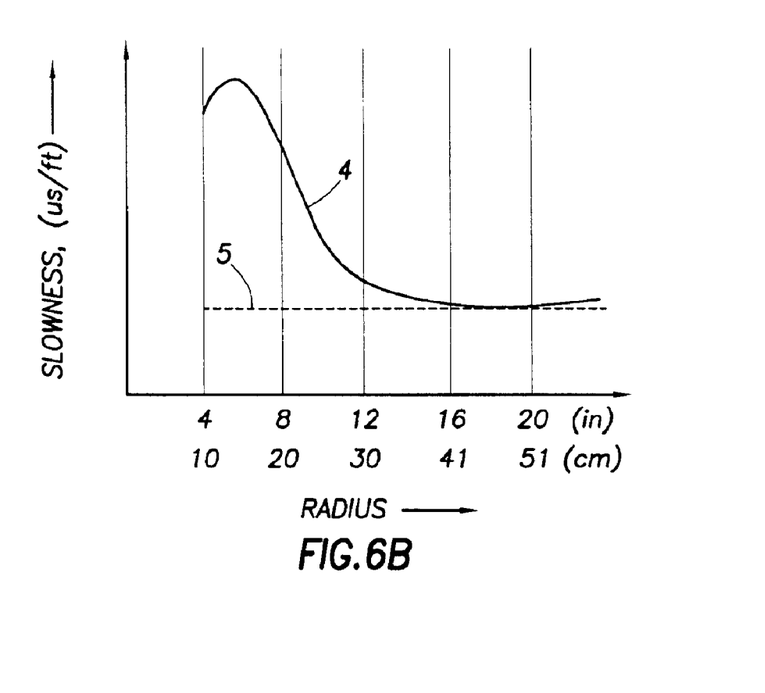

FIG. 6B shows that the shear slowness ($\Delta t$) measurements (curve 4) deviate substantially in the near wellbore region from what would be expected in the absence of stresses (curve 5). This observation is consistent with the notion that the deviation is due to wellbore stresses. FIG. 6B also suggests that shear slowness ($\Delta t$) could be a good indicator of formation stresses that are induced by the wellbore.

As noted above, wellbore stresses are functions of far-field stresses and wellbore pressures. Thus, to assess wellbore stresses, it is necessary that the far-field stresses are known. In accordance with embodiments of the invention, the next step is to derive the far-field formation stresses (step 540 in FIG. 5).

Among the far-field stresses, the vertical far-field stress ($\sigma_v$) arises from formation overburden at the depth of investigation. Therefore, the vertical far-field stress ($\sigma_v$) can be derived from integrating formation density all the way to the surface. One of ordinary skill in the art would appreciate that formation density (or its complement, porosity) may be measured with various instruments known in the art, such as neutron tools, nuclear magnetic resonance tool, etc. The far-field minimum horizontal stress ($\sigma_h$) may be derived from the wellbore pressure observed h when a vertical fracture closes. The far-field maximum horizontal stress ($\sigma_H$) may be conveniently estimated from the minimum horizontal stress ($\sigma_h$) based on knowledge of the formation property in the area. For example, in the Gulf of Mexico, the maximum horizontal stress ($\sigma_H$) is often estimated to be slightly more than the minimum horizontal stress ($\sigma_h$), e.g., $\sigma_H \approx 1.01 \times \sigma_h$. The above describes one approach to deriving the far-field formation stresses, one of ordinary skill in the art would appreciate that other methods for deriving these stresses may also be used without departing from the scope of the present invention. For example, the methods disclosed in U.S. Pat. Nos. 5,838,633 and 6,351,991 may also be used to derive far-field formation stresses.

Among the wellbore stresses, only the radial stress ($\sigma_r$) can be determined from log data (i.e., wellbore pressure). The other two stresses ($\sigma_a$, $\sigma_t$) are not available from log data. The axial stress ($\sigma_a$) is typically not much different from the far-field vertical stress ($\sigma_v$). Thus, it may be assumed that $\sigma_a = \sigma_v$. Accordingly, only the tangential stress ($\sigma_t$) is not defined. The tangential stress ($\sigma_t$) can be determined from the formation stress model based on other stresses, as described in the following sections.

Referring again to FIG. 5, in accordance with embodiments of the invention, the method next chooses a formation model for assessing the formation strength (step 56). The rock deformation model may correspond to, but is not limited to, a three-dimensional linear elastic model, a two-dimensional non-linear model, a non-linear elastic model, an elasto-plastic model, a plastic model, an explicit constitutive model, etc. While more complicated models may be used, a linear elastic model conventionally used in the art may be used with embodiments of the invention. Thus, according to the linear elastic model, various formation stresses (both the far-field stresses $\sigma_v$, $\sigma_h$, $\sigma_H$, and the wellbore stresses $\sigma_a$, $\sigma_t$, $\sigma_r$) may be correlated as shown in FIG. 2. The formation stress profile in FIG. 2 is shown as a function of radial distance from the wellbore. Therefore, the formation stress profile is also referred to as a "radial stress profile." Note that because the tangential stress ($\sigma_t$) is not yet defined, curve 2 in FIG. 2 cannot be defined. However, if the cross-over (mode transition) point M shown in FIG. 2 can be determined, then curve 2 can be defined.

The mode transition point M in FIG. 2 may be determined by taking several measurements (e.g., the acoustic measurements) at different wellbore pressures. As noted above, wellbore pressure (or ECD) controls the radial stress ($\sigma_r$) and, indirectly, the tangential or hoop stress ($\sigma_t$). As ECD increases, the radial stress ($\sigma_r$) increases, but the tangential stress ($\sigma_t$) decreases. On the other hand, the axial stress ($\sigma_a$) is substantially independent of the ECD, as shown in FIG. 3A.

Because shear stress is a function of the difference between the maximum stress and the minimum stress under the particular condition, the effective shear stress would be governed by the difference between different types of wellbore stresses at different ECD. FIG. 3B shows the effective shear stress as a function of the ECD. As shown in region 1, the effective shear stress is the difference between the tangential stress ($\sigma_t$) and the radial stress ($\sigma_r$). In region 2, the effective shear stress is the difference between the axial stress ($\sigma_a$) and the radial stress ($\sigma_r$). In region 3, the effective shear stress is the difference between the axial stress ($\sigma_a$) and the tangential stress ($\sigma_t$). In region 4, the effective shear stress is the difference between the radial stress ($\sigma_r$) and the tangential stress ($\sigma_t$).

It is apparent from FIG. 3B that the slopes of the line segments 1 and 4 are twice the slopes of the line segments 2 and 3. Therefore, by monitoring the changes of effective shear stress as a function of ECD (or wellbore pressure), it is possible to determine the mode transition point M, where the axial stress ($\sigma_a$) and the tangential stress ($\sigma_t$) change roles as the maximum stress. Once the mode transition point M is determined, the formation stress profile as shown in FIG. 2 can be completely defined. Accordingly, the delta shear stress curve 4 shown in FIG. 2 can also be defined (step 580).

Curve 4 in FIG. 2 shows the delta shear stress ($\Delta ss$) as a function of radial distance away from the wellbore. As shown, $\Delta ss$ initially rises slowly as one moves from far-field towards the wellbore. At around 6 inches from the wellbore, the rise in $\Delta ss$ dramatically increases. The departure point observed at approximately 6 inches typically corresponds to a mode transition. A mode transition occurs when the source of the maximum stress changes. In this particular example (see FIG. 2), initially the far-field vertical stress ($\sigma_v$) is the maximum stress. However, at less than 6 inches away from the wellbore, the tangential stress ($\sigma_t$) becomes the maximum stress.

Figure 7A:
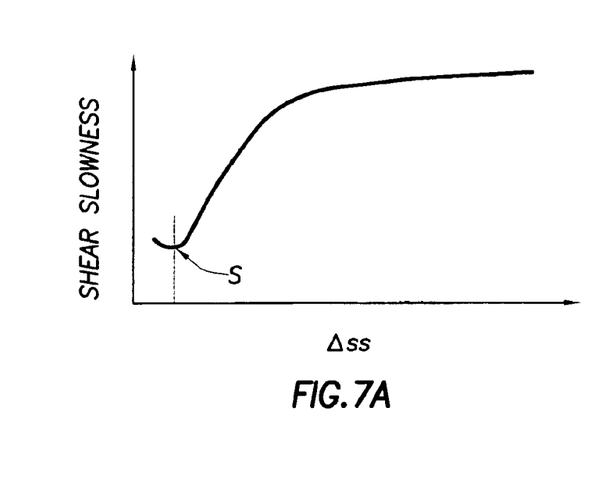
FIGS. 7A and 7B show comparison plots of shear slowness and shear modulus versus delta shear stress in accordance with one embodiment of the invention.

The $\Delta ss$ function shown as curve 4 in FIG. 2 and the shear slowness function shown in FIG. 6B can be combined to give a comparison plot shown in FIG. 7A, which shows the shear slowness (Δt) as a function of Δss. FIG. 7A provides a direct correlation between the formation property measurements (e.g., shear slowness, Δt) and the formation stress (Δss). In an alternative approach, a more sensitive correlation between the formation property measurements (e.g., the shear slowness) and the formation stress may be constructed, shown in FIG. 7B, if the shear slowness in FIG. 7A is replaced with a modulus function known in the art, such as a shear modulus, Young's modulus, bulk modulus, Poisson's ratio, and Lame's constant lambda. The following description use, for illustration, a shear modulus (G) defined as: $G=\rho_b/(\Delta t)^2$, where $\rho_b$ is the bulk density of the formation and Δt is the shear slowness.

Figure 7B:
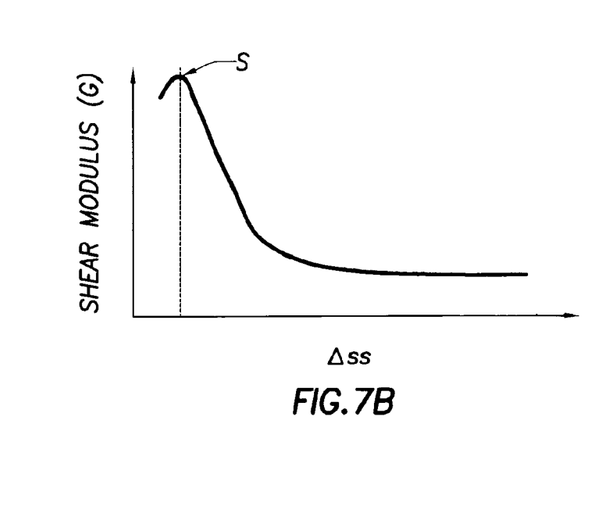

Once a comparison plot, shown as FIG. 7A or FIG. 7B, is available, the formation strength may be derived from the analysis of the plot (step 590 in FIG. 5). As shown in FIGS. 7A and 7B, the formation shear strength can be found as the inflection point S, where the dependence of the shear slowness (or shear velocity) on the shear stress changes direction. The basis for this analysis is illustrated in FIG. 8.

Figure 8:
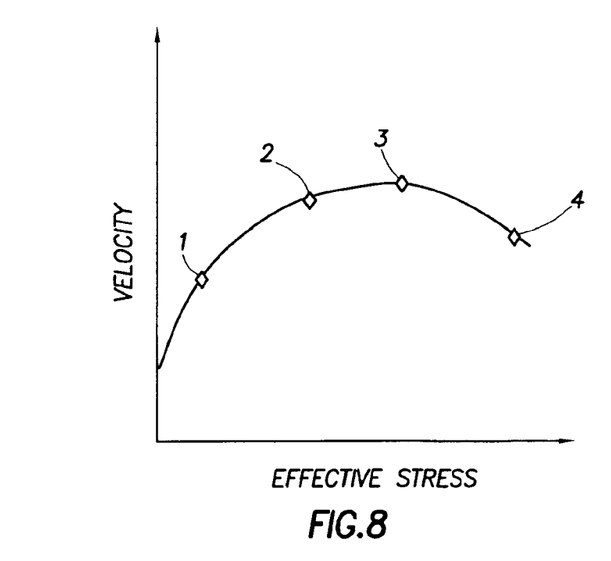
FIG. 8 shows acoustic velocities as a function of formation stresses.

FIG. 8 illustrates acoustic velocity variations with effective stresses (or loading) of a formation. When the effective stress is low, as illustrated at Point 1, a small increase in the effective stress causes a large increase in the acoustic velocity. This is due to the fact that the increased stress forces the grains of the formation into closer contact with neighboring grains. However, as the effective stress increases, some grains in the formation start to reorient or cementation begins to break, and the rate of the increases in the acoustic velocity slows (Point 2). At some point (Point 3) when the formation is about to yield or fail, the acoustic velocity becomes independent of the effective shear stress. Therefore, the formation strength, which equals the level of stress needed to yield or fail the formation, may be estimated by finding the inflection points (e.g., point 3) on an acoustic velocity-versus-stress curve. Similarly, the formation strength may be estimated from the inflection points S on a shear slowness (Δt)-versus-Δss curve (FIG. 7A) or a shear modulus (G)-versus-Δss curve (FIG. 7B). Finally, with further increases in the shear stresses, the formation begins to yield and fail, and the acoustic velocities begin to decrease (Point 4).

Figure 9A:
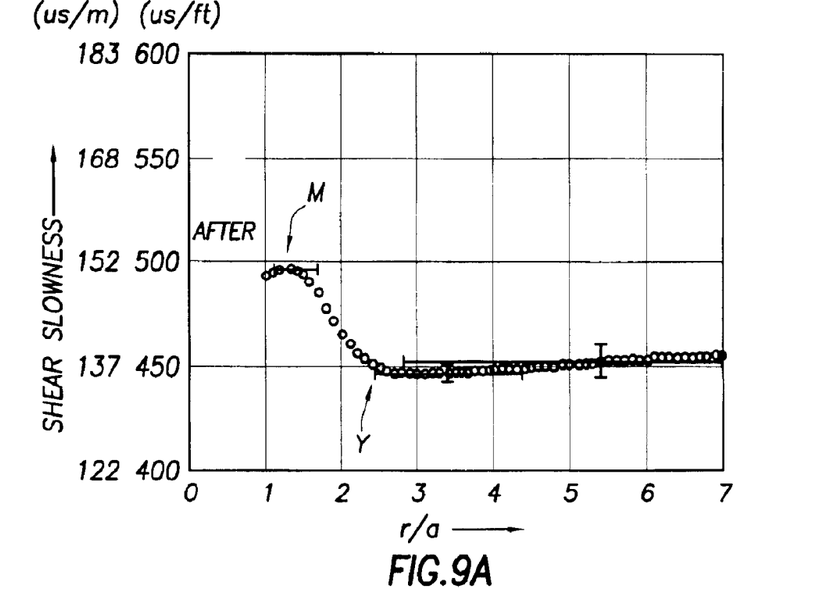
FIG. 9A shows shear slowness as a function of distance away from the wellbore in a radial profiling according to one embodiment of the invention.
Figure 9B:
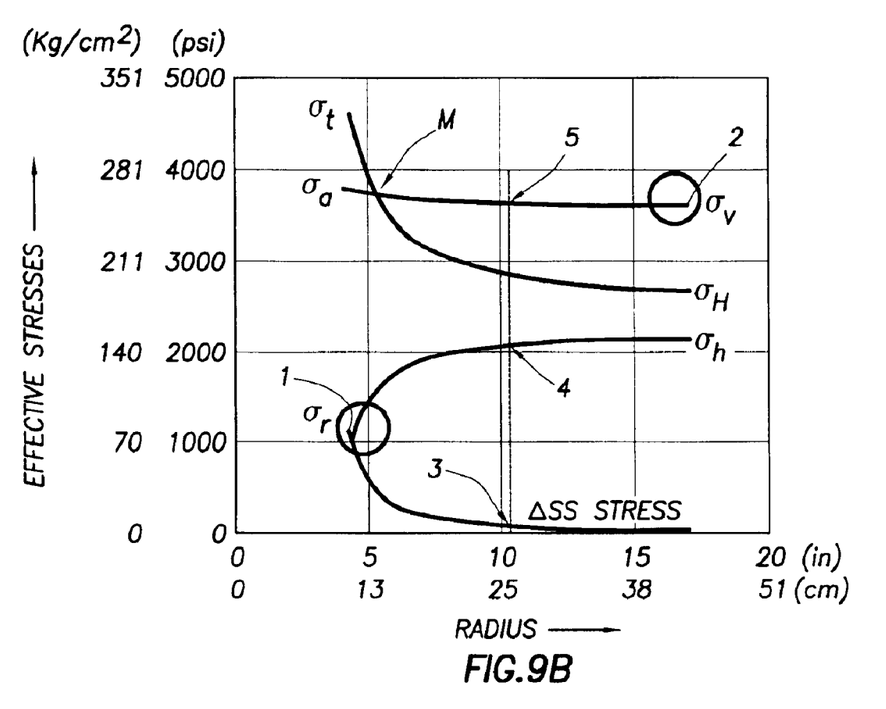
FIG. 9B shows a formation stress profile plot in accordance with one embodiment of the invention.

Some embodiments of the invention provide methods for determining a formation stress profile from radial profiling of the formation using acoustic tools equipped with dipole sources (e.g., 226 in FIG. 4). A formation radial profiling uses a proper measurement to probe formation properties as a function of a radial distance from the wellbore. FIG. 9A shows a formation radial profiling using dipole sonic measurements. As shown, the shear slowness measurements are plotted against the distance away from the wellbore in terms of a ratio (r/a) of the distance (r) over the radius of the wellbore (a). The shear slowness decreases slowly (or shear velocity increases slowly) as one moves from far field closer to a wellbore, i.e., between r/a=7 and r/a=3. The slow increases of the shear velocity reflects the gradual increase of formation loading which pushes the grains closer together (see point 2 in FIG. 8). However, when one gets closer than r/a=2.5, the shear slowness increases dramatically (or the shear velocity decreases dramatically). The sudden change in the curvature indicates that the loading in this region is higher than the yield and/or fail strength of the formation such that the formation yielded or failed (see point 4 in FIG. 8). Therefore, the point (shown as Y) where the sudden change of curve directions occurs indicates a location of formation property changes (yield boundary). If the shear stress at that particular location is known, then the formation yield strength may be derived from the shear stresses. For example, as shown in FIG. 9B, the point 3 on the Δss curve corresponds to the location of point Y (yield) in FIG. 9A. Thus, it is possible to derive the formation strength from the shear stress at point 3. A method of radial profiling using sonic well logging is disclosed in U.S. Pat. No. 6,611,761 issued to Sinha et al. and assigned to the assignee of the present invention. This patent is incorporated by reference in its entirety.

Referring to FIG. 9A again, if one continues to move closer to the wellbore, the increase in the shear slowness levels off (or starts to decrease) at about r/a=1.3. The location of this transition is marked as point M. Point M indicates another formation property changes, which is most likely a mode transition where tangential stress ($\sigma_t$) replaces the far-field vertical stress ($\sigma_v$) as the maximum stress. Therefore, radial profiling of the formation using a sonic tool equipped with dipole sources can provide locations of the formation yield, formation yield strength, and the location of the mode transition. Having this information, it becomes possible to estimate a formation stress profile.

Figure 10:
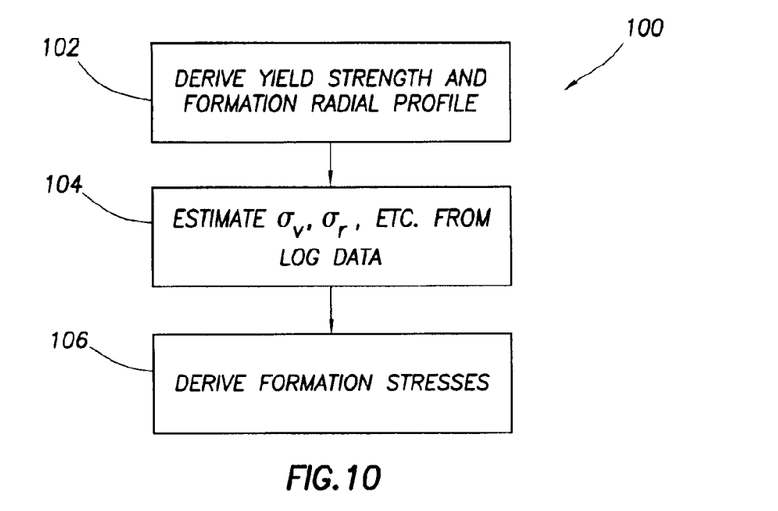
FIG. 10 shows a method for determining formation stresses from formation strength in accordance with one embodiment of the invention.

Some embodiments of the invention relate to methods for estimating formation stresses from formation radial profiling. FIG. 10 shows a method 100 in accordance with the invention for deriving formation stresses from formation radial profiling. First, the formation strength, yield location, and mode transition location may be derived from a formation radial profiling using a sonic tool equipped with dipole sources (step 102). This step may be accomplished according to the processes described above with reference to FIGS. 9A and 9B. Next, certain formation stresses may be derived from log data (step 104). For example, the far-field vertical stress ($\sigma_v$) can be derived from formation density log, and the wellbore radial stress ($\sigma_r$) can be derived from wellbore pressure measurements. In addition, the locations of the yield (point Y in FIG. 9A) and mode transition (point M in FIGS. 9A and 9B) may be determined from the formation radial profiling as described above. Having these parameters, the formation stress profile may then be determined (step 106).

Referring to FIG. 9B, as noted above, the location and shear stress of point 3 may be derived from the yield point Y in FIG. 9A. The shear stress at point 3 corresponds to the formation shear strength. When $\sigma_v$, $\sigma_r$, and the formation yield strength are known, the shear stress values of points 4 and 5 in FIG. 9B can be defined. This is because the stress at point 5 should be substantially the same as the far-field vertical stress indicated at point 2. Then, the shear stress value at point 4 is simply the difference between the value at point 5 and the formation yield strength. Once the stress value at point 4 is defined, the far-field minimum horizontal stress ($\sigma_h$) can be assumed to be substantially the same as (or slightly higher than) the stress at point 4. Alternatively, $\sigma_h$ may be derived from the pressure observed when an induced fracture closes. With this knowledge, the $\overleftrightarrow{\sigma_r}$ $\overleftrightarrow{\sigma_h}$ transition curve can be defined.

Note that the radial profiling also provides the location of the mode transition (point M). The knowledge of the location of point M together with the stress values at points 5 and 2 makes it possible to define the $\overleftrightarrow{\sigma_a}$ $\sigma_v$ transition curve. In addition, the knowledge of point M together with $\sigma_H$, which may be derived from other log data, makes it possible to define the $\overleftrightarrow{\sigma_t}$ $\sigma_H$ transition curve. Accordingly, the formation stress profile shown in FIG. 9B may be determined.

Some embodiments of the invention relate to methods for monitoring wellbore stability, using subsurface sonic wave velocity (or slowness) measurements, referred to as Delta-T ($\Delta T_c$). The velocity (or slowness) measurements may be compressional velocity derived from the headwave mode or the leaky-compressional mode, shear velocity derived from the borehole quadrupole mode, the headwave mode, or the dipole flexural mode, or Stoneley wave velocity derived from the monopole Stoneley mode. Alternatively, the acoustic measurements may include full waveform measurements that can then be analyzed to provide information on various modes such as trapped mode, normal mode, leaky mode, and hybrid mode, and pseudo-Rayleigh mode. In accordance with a method of the invention, two $\Delta T_c$ values ($\Delta t_{c1}$ and $\Delta t_{c1}$) are measured at two different wellbore pressures, ($P_1$ and $P_2$), respectively. The two different wellbore pressures (or ECD) may be created by any method known in the art, for example by changing the mud weight, by changing the pumping rates, by turning the pump on and off, by changing the setting of a valve, by allowing ingress of formation fluids, or a combination thereof. A stability indicator (X) is then defined as, $X=(\Delta T_{c1}-\Delta T_{c2})/(P_1-P_2)$. That is, X corresponds to the rate at which the $\Delta T_c$ changes with the wellbore pressure.

Referring to FIG. 3B, different ECD changes (or wellbore pressure changes) may cause different extents of changes in the effective stresses. This is because the slopes of the line segments shown in FIG. 3B are different, depending on the ECD values. Because the effective stress affects $\Delta T_c$, the stability indicator X defined above is indirectly related to the slopes shown in FIG. 3B. Therefore, depending on the sign and magnitude of X, it is possible to decipher where on the curve in FIG. 3B the two pressures ($P_1$ and $P_2$) (or ECD) fall. Knowing where the pressures (or their corresponding ECD values) are in FIG. 3B, it becomes possible to determine whether the well is under high stress or low stress. If necessary, mud weights may be changed to improve borehole stability. In other words, the stability indicator X may be used to help identify if the mud weight was running close to optimal or whether dangerously low or high.

Figure 11:
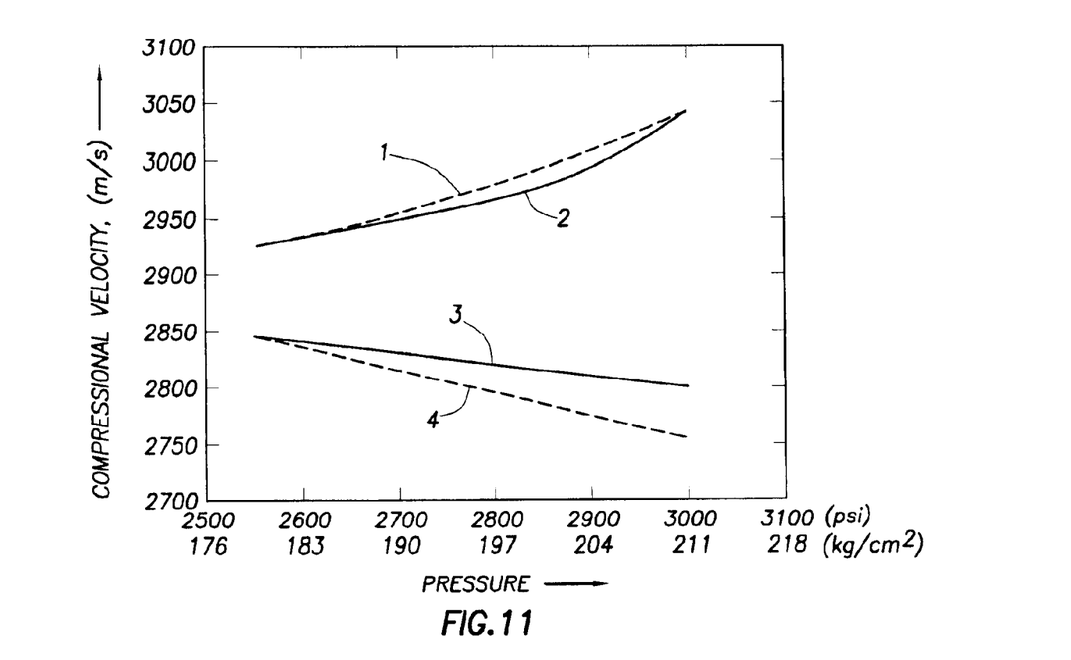
FIG. 11 shows acoustic responses as a function of wellbore pressures in accordance with on embodiment of the invention.

FIG. 11 illustrates a method of probing the formation properties using acoustic compressional velocity measurements as a function of wellbore pressure. As shown, curve 1 illustrates the compressional velocity responses of a formation as the wellbore pressure is increased, and curve 2 illustrates the compressional velocity responses of the same formation as the wellbore pressure is decreased. The behaviors of these curves indicate that the compressional velocity increases as the pressure increases, suggesting the formation loading is below the yield strength (see point 1 or 2 in FIG. 8). The stability indicator X corresponding to both these curves will be positive.

Curve 3 in FIG. 11 shows the change of compressional velocities as a function of decreasing pressure and curve 4 shows the reversal of this process. Note that the formation does not return to the same state after the pressure reduction and increase cycle. Furthermore, curves 3 and 4 both show that the compressional velocities decrease with increasing loading and thus the stability indicator will be negative (see point 4 in FIG. 8). These observations suggest that the formation loading is greater than the formation yield and/or fail strength, i.e., the formation has yielded or failed. FIG. 11 shows that geomechanical properties of a formation may be determined using acoustic measurements together with wellbore pressure measurements.

While the embodiments of the invention have been described using acoustic measurements, one of ordinary skill in the art would appreciate that other types of measurements that are sensitive to formation pressure changes may also be used. Note that with acoustic measurements, either shear, compressional, or Stoneley velocity measurements may be used. Other measurements that may be used with embodiments of the invention may include, for example, resistivity measurements, spontaneous potential measurements, etc.

Figure 12:
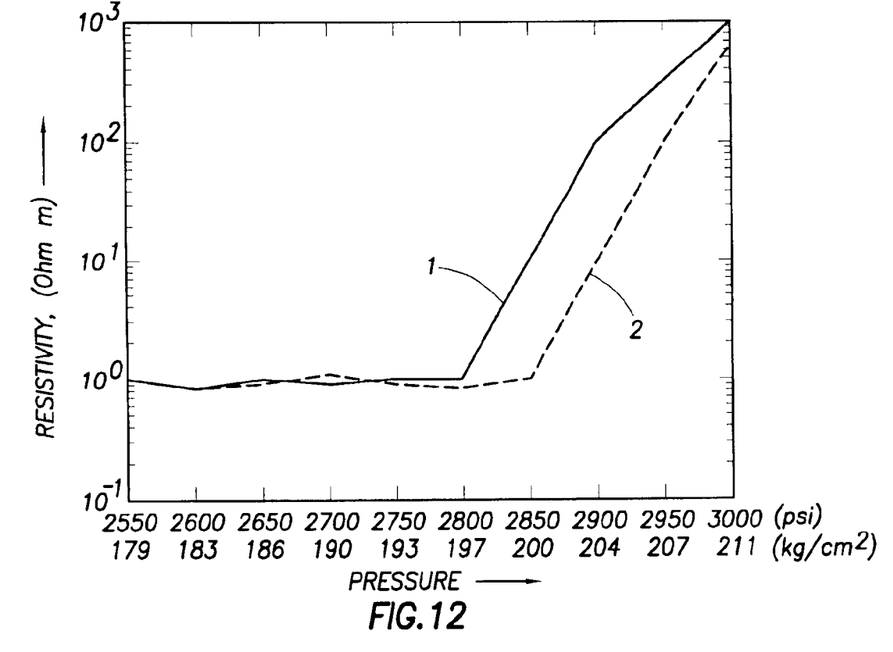
FIG. 12 shows resistivity responses as a function of wellbore pressures in accordance with one embodiment of the invention.

FIG. 12 illustrates a method of the invention using measurements other than acoustic measurements (i.e., resistivity) to probe formation properties around the wellbore. This example shows that in the presence of a drilling induced fracture, resistivity measurements can be used to probe the fracture closure and opening pressures. If the well is drilled with an oil-based mud, then mud penetration into the rock is visible in the resistivity log by an increase in resistivity. As the pressure rises and falls, the fracture aperture increases and decreases, falling to a minimum at the fracture closure pressure. As the pressure falls below the fracture closure pressure, the resistivity remains constant.

As shown in FIG. 12, curve 1 corresponds to measurements made while lowering the well pressure, and curve 2 corresponds to those made with increasing pressures. When the pressure is reduced, the resistivity goes down until it reaches a baseline value (2800 psi in this example), which corresponds to the fracture closure pressure. As the pressure is increased again (above 2850 psi in this example), the resistivity increases, indicating the reopening of the fracture.

One of ordinary skill in the art would appreciate that resistivity measurements may also be made with tools capable of multiple depths of investigation (DOI) (different distances into the formation from the wellbore). For example, U.S. Pat. No. 4,899,112 issued to Clark et al. discloses one such instrument. If the measurements shown in FIG. 12 are made at different DOIs, then the curves for deep DOI measurements would reach a baseline value before those of the shallow DOI measurements. If the formation has significant damages, then the shallow DOI measurements may show a higher resistivity than the deep DI measurements at all pressures, indicating incomplete closure of the fractures near the borehole. The above description assumes a conductive formation drilled with an oil-based mud. If the well is drilled with a water-based mud in a resistive formation, then the increase or decrease in the resistivity measurements would be reversed.

Other measurements that respond to pressure changes include spontaneous potential (SP) measurements. SP is well known to vary with borehole pressure. In a highly permeable rock, SP is proportional to the permeability of the mud cake. In less permeable rocks, SP is proportional to the permeability of the near wellbore formation (mud cake plus rock). SP in shales is typically used to provide a baseline for quantitative SP in permeable rocks, and measuring the baseline at different pressures would allow the appropriate values to be used for sandstone measurements. U.S. Pat. No. 4,625,173, issued to Wisler et al. discloses an instrument for measuring SP while drilling.

Figure 13:
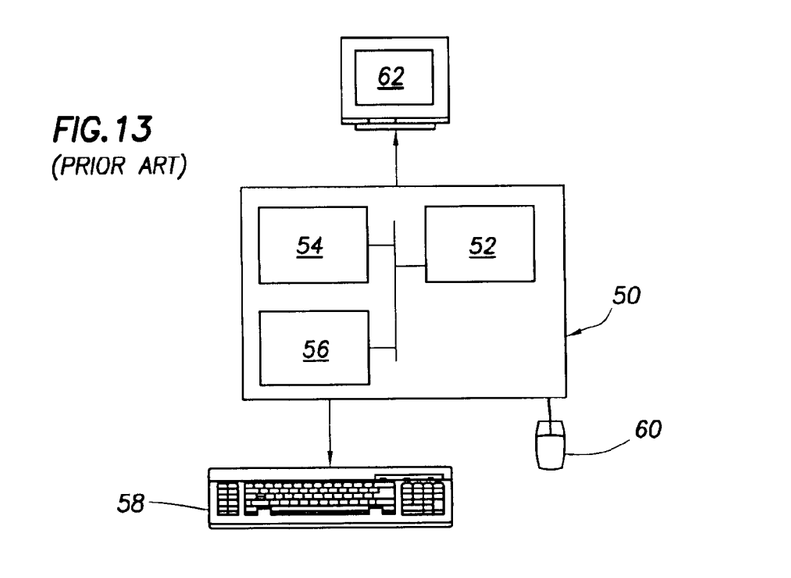
FIG. 13 shows a prior art computer system that can be used with embodiments of the invention.

In addition, other wireline or logging-while-drilling (LWD) measurements, such as nuclear porosity and density and magnetic resonance measurements may show variation with borehole pressures in some situations. For example, in a very compliant rock, both the rock density and porosity may show variations with changing wellbore pressure, and thus in these rocks, the formation property being measured would be respectively the change in density divided by the change in pressure, and the change in porosity divided by the change in pressure. Some embodiments of the invention relate to systems for performing the methods described above. A system in accordance with embodiments of the invention may be a stand-alone unit for performing methods of the invention or may be incorporated into a drilling tool (e.g., the onboard processor unit 230 shown in FIG. 4). A system in accordance with the invention typically includes a processor and a memory. In some embodiments, a system may be implemented on a general-purpose computer having a processor, a memory, and may optionally include other hardware. For example, as shown in FIG. 13, a typical computer (50) includes a processor (52), a random access memory (54), and a storage device (e.g., permanent memory or hard disk) (56). The computer (50) may also include input means, such as a keyboard (58) and a mouse (60), and output means, such as a monitor (62). Note that the general purpose computer is only for illustration and embodiments of the invention may take other forms (e.g., integrated in a logging tool).

In a system in accordance with the invention, the memory stores a program readable by the processor. The program, for example, may include instructions for performing the above described methods, obtaining formation measurements; estimating the far-field stresses; obtaining the radial stress; generating a stress profile using a rock deformation model; generating a delta shear stress plot; and analyzing a comparison plot of the shear slowness versus the delta shear stress.

A system in accordance with the present invention provides new and improved techniques to evaluate formation strength properties or in-situ stresses. The programming may be accomplished through the use of one or more program storage devices readable by the computer processor and encoding one or more programs of instructions executable by the computer for performing the operations described herein. The program storage device may take the form of, for example, one or more floppy disks; a CD-ROM or other optical disk; a magnetic tape; a read-only memory chip (ROM); and other forms of the kind well known in the art. The program of instructions may be in "object code," i.e., in binary form that is executable directly by the computer; in "source code" that requires compilation or interpretation before execution; or in some intermediate form such as partially compiled code. The precise forms of the program storage device and of the encoding of instructions are immaterial here.

Embodiments of the invention rely on formation property measurements as a function of the radial distance from the wellbore (e.g., formation radial profiling) and/or as a function of wellbore pressures (or ECD). These measurements may be acquired with a wireline tool or an LWD/MWD tool. When measurements are acquired as a function of the radial distance, they may be performed with a single tool capable of different depth of investigation (DOI) or with a combination of tools having different ODI.

When the measurements are acquired as a function of wellbore pressures, various approaches may be used to produce different wellbore pressures, such as changing a pump rate, turning a pump on and off, changing a weight of the drilling fluid, changing a valve setting, allowing ingress of formation fluids, and a combination thereof. These measurements may be acquired in a cased borehole, open borehole, or in a section of a borehole that is isolated from the remainder of the borehole by a pair of packers. For example, as noted above, the measurements may be performed in a manner similar to a leak-off test (LOT) a section of the borehole is sealed off and the formation property measurements are acquired as a function of pressure changes in the sealed off section. The pressure changes in the sealed-off section may arise from the ingress or egress of the borehole fluids or formation fluids. Alternatively, a pump may be provided to change the pressures inside the sealed-off section.

Many formation testing tools are capable of sealing off a section of a borehole, one example of which is a modular dynamic formation fluid tester sold under the trade name of MDT™ by Schlumberger Technology (Houston, Tex.). Such tools (e.g., the MDT™) also have pumps that can be used to change the pressures inside the sealed off section of the borehole. One of ordinary skill in the art would appreciate that a suitable sensor (e.g., a sonic sensor) may be included on these tools to perform the measurements as a function of pressures inside the sealed-off section.

Embodiments of the present invention may have some of the following advantages. In-situ methods are provided for determining formation strength and stress parameters. Methods are provided that can be used to determine formation stresses from formation strength, or vice versa. Embodiments of the invention are capable of accurate the formation strength property measurements, i.e., about ~100 psi error range (much smaller than the prior art methods that may have errors up to 1000 psi or more). The methods provide means to verify the stress profiles generated using rock deformation models. In addition, methods are provided that can be used to probe formation properties in response to wellbore pressure changes using various measurements that are sensitive to wellbore changes.

For the purposes of this specification it will be clearly understood that the word "comprising" means "including but not limited to", and that the word "comprises" has a corresponding meaning.

What is claimed is:

1. A method for determining a property of a formation, comprising:
   obtaining radial formation property measurements at different wellbore pressures;
   generating a radial stress profile based on a formation model;
   generating a radial stress function from the radial stress profile; and
   comparing the radial formation property measurements with the radial stress function to determine a formation strength.

2. The method of claim 1, wherein the radial formation property measurements comprise acoustic measurements of one selected from shear slowness, compressional slowness, Stoneley slowness, and a combination thereof.

3. The method of claim 2, wherein the comparing comprises converting the acoustic measurements into a modulus function selected from shear modulus function, Young's modulus function, bulk modulus function, Poisson's ratio function, and Lame's constant lambda function.

4. The method of claim 1, wherein the different wellbore pressures are obtained by a method selected from changing a pump rate, turning a pump on and off, changing a weight of a drilling fluid, changing a valve setting, allowing ingress of formation fluids, and a combination thereof.

5. The method of claim 1, wherein the formation model is one selected from a linear elastic model, a non-linear elastic model, an elasto-plastic model, a plastic model, and an explicit constitutive model.

6. The method of claim 1, wherein the generating the radial stress profile comprises estimating far-field formation stresses and a wellbore radial stress, the far-field formation stresses comprising a vertical stress, a maximum horizontal stress, and a minimum horizontal stress.

7. The method of claim 6, wherein the vertical stress is estimated from a formation density measurement and the minimum horizontal stress is estimated from a pressure observed when an induced vertical fracture closes.

8. The method of claim 6, wherein the estimating the radial wellbore stress is based on one selected from a weight of a drilling fluid, a wellbore pressure, an equivalent circulating density, and a combination thereof.

9. The method of claim 1, wherein the radial stress function is one selected from a shear stress function or a delta shear stress function.

10. The method of claim 9, wherein the delta shear stress function is according to: $\Delta ss = \frac{1}{2}(\sigma_1 - \sigma_3) - \frac{1}{2}(\sigma_v - \sigma_h)$, wherein $\Delta ss$ is the delta shear stress function, $\sigma_v$ is a far-field vertical stress, $\sigma_h$ is a minimum horizontal far-field stress, $\sigma_1$ is a maximum stress at a given distance from a wellbore, and $\sigma_1$ is a minimum stresses at the given distance from the wellbore.

11. The method of claim 1, wherein the formation strength is one selected from a formation yield strength, a formation failure strength, and a combination thereof.

12. The method of claim 1, wherein the comparing uses a comparison plot of shear slowness versus a delta shear stress function.

13. A method for determining a property of a formation, comprising:
deriving formation parameters from a formation radial profiling;
obtaining formation log data that comprise formation density data;
estimating formation stresses from the formation log data; and
deriving a radial stress profile based on a formation model, the derived formation parameters, and the estimated formation stresses.

14. The method of claim 13, wherein the formation radial profiling uses acoustic measurements acquired with a sonic tool equipped with a dipole source.

15. The method of claim 14, wherein the acoustic measurements comprise shear slowness measurements as a function of a distance away from a wellbore.

16. The method of claim 13, wherein the formation parameters comprise ones selected from a formation strength, a location of formation yield, a location of mode transition, and combinations thereof.

17. The method of claim 13, wherein the estimating the formation stresses comprises estimating a far-field vertical stress from the formation density data, estimating a far-field minimum horizontal stress from a pressure observed when an induced vertical fracture closes, and estimating a radial wellbore stress based on one selected from a wellbore pressure, a weight of a drilling fluid, an equivalent circulating density, and a combination thereof.

18. A method for monitoring formation stability, comprising:
obtaining formation property measurements at at least two different wellbore pressures; and
deriving a rate of change of the formation property measurements as a function of wellbore pressure to monitor the formation stability.

19. The method of claim 18, wherein the formation property measurements comprise acoustic measurements.

20. The method of claim 19, wherein the acoustic measurements comprise one selected from compressional slowness measurements, shear slowness measurements, and Stoneley slowness measurements.

21. The method of claim 18, wherein the different wellbore pressures are achieved by one selected from changing a pump rate, turning a pump on and off, changing a weight of a drilling fluid, changing a valve setting, allowing ingress of formation fluids, and a combination thereof.

22. A system for determining a property of a formation, comprising:
a computer system having a memory for storing a program including instructions for:
obtaining radial formation property measurements at different wellbore pressures;
generating a radial stress profile based on a formation model;
generating a radial stress function from the radial stress profile; and
comparing the radial formation property measurements with the radial stress function to determine a formation strength.

23. The system of claim 22, wherein the radial formation property measurements comprise acoustic measurements of one selected from shear slowness, compressional slowness, Stoneley slowness, and a combination thereof.

24. The system of claim 23, wherein the comparing comprises converting the acoustic measurements into a modulus function selected from shear modulus function, Young's modulus function, bulk modulus function, Poisson's ratio function, and Lame's constant lambda function.

25. The system of claim 22, wherein the different wellbore pressures are obtained by a method selected from changing a pump rate, turning a pump on and off, changing a weight of a drilling fluid, and a combination thereof.

26. The system of claim 22, wherein the formation model is one selected from a linear elastic model, a non-linear elastic model, an elasto-plastic model, a plastic model, and an explicit constitutive model.

27. The system of claim 22, wherein the generating the radial stress profile comprises estimating far-field formation stresses and a wellbore radial stress, the far-field formation stresses comprising a vertical stress, a maximum horizontal stress, and a minimum horizontal stress.

28. The system of claim 27, wherein the vertical stress is estimated a from formation density measurement, the minimum horizontal stress is estimated from a pressure observed when an induced vertical fracture closes, and the radial wellbore stress is estimated from one selected from a weight of a drilling fluid, a wellbore pressure, an equivalent circulating density, and a combination thereof.

29. The system of claim 22, wherein the radial stress function is one selected from a shear stress function and a delta shear stress function.

30. The system of claim 29, wherein the delta shear stress function is according to: $\Delta ss = \frac{1}{2}(\sigma_1 - \sigma_3) - \frac{1}{2}(\sigma_v - \sigma_h)$, wherein $\Delta ss$ is the delta shear stress function, $\sigma_v$ is a far-field vertical stress, $\sigma_h$ is a minimum horizontal far-field stress, $\sigma_1$ is a maximum stress at a given distance from a wellbore, and $\sigma_1$ is a minimum stresses at the given distance from the wellbore.

31. The system of claim 22, wherein the formation strength is one selected from a formation yield strength, a formation failure strength, and a combination thereof.

32. A system for determining a property of a formation, comprising:
a computer system having a memory for storing a program including instructions for:
deriving formation parameters from a formation radial profiling;
obtaining formation log data that comprise formation density data;
estimating formation stresses from the formation log data; and
deriving a radial stress profile based on a formation model, the derived formation parameters, and the estimated formation stresses.

33. The system of claim 32, wherein the formation radial profiling uses acoustic measurements acquired with a sonic tool equipped with a dipole source.

34. The system of claim 33, wherein the acoustic measurements comprise shear slowness measurements as a function of a distance away from a wellbore.

35. The system of claim 32, wherein the formation parameters comprise one selected from a formation strength, a location of formation yield, a location of mode transition, and a combination thereof.

36. The system of claim 32, wherein the estimating the formation stresses comprises estimating a far-field vertical stress from the formation density data, estimating a far-field minimum horizontal stress from a pressure required to fracture the formation, and estimating a radial wellbore stress based on one selected from a wellbore pressure, a weight of a drilling fluid, an equivalent circulating density, and a combination thereof.

37. A method for assessing a formation property, comprising:

obtaining a series of formation property measurements at different wellbore pressures; and analyzing a rate of change of the series of formation property measurements as a function of wellbore pressures to derive the formation property.

38. The method of claim 37, wherein the formation property measurements comprise one selected from acoustic measurements, resistivity measurements, spontaneous potential measurements, and a combination thereof.

39. The method of claim 37, wherein the different wellbore pressures are achieved by one selected from changing pump rates, turning a pump on and off, changing a weight of a drilling fluid, changing a valve setting, allowing ingress of formation fluids, and a combination thereof.

* * * * *